United States Patent
Jaynes et al.

(10) Patent No.: US 7,119,833 B2
(45) Date of Patent: Oct. 10, 2006

(54) MONITORING AND CORRECTION OF GEOMETRIC DISTORTION IN PROJECTED DISPLAYS

(75) Inventors: Christopher O. Jaynes, Lexington, KY (US); Robert M. Steele, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 496 days.

(21) Appl. No.: 10/727,953

(22) Filed: Dec. 3, 2003

(65) Prior Publication Data

US 2004/0155965 A1    Aug. 12, 2004

Related U.S. Application Data

(60) Provisional application No. 60/430,575, filed on Dec. 3, 2002.

(51) Int. Cl.
*H04N 17/00* (2006.01)
*H04N 3/26* (2006.01)

(52) U.S. Cl. ...................... 348/189; 348/745
(58) Field of Classification Search ................ 348/174, 348/175, 187, 189, 180, 745, 746, 747, 806; 324/620; 353/69; 382/275; 455/501, 63.1, 455/67.13; 702/69, 85; H04N 17/00, 3/22, H04N 3/26
See application file for complete search history.

(56) References Cited

U.S. PATENT DOCUMENTS

| | | | |
|---|---|---|---|
| 5,506,597 A | 4/1996 | Thompson et al. | 345/85 |
| 5,871,266 A | 2/1999 | Negishi et al. | 353/98 |
| 6,437,823 B1 * | 8/2002 | Zhang | 348/187 |
| 2002/0164074 A1 | 11/2002 | Matsugu et al. | 382/173 |

OTHER PUBLICATIONS

Rahul Sukthankar, Stockton, R.G., and Mullin, M.D., "Smarter Presentations: Exploiting Homography in Camera-Projector Systems," *ICCV* (2001) {labeled "ATTACHMENT C" of applicants' provisional app. filed Dec. 3, 2002 as background technical information}.

Claudio Pinhanez, "Augmenting Reality with Projected Interactive Displays," *VAA* (2001) 9 pages {labeled "ATTACHMENT D" of applicants' provisional app. filed Dec. 3, 2002 as background technical information}.

(Continued)

*Primary Examiner*—Sherrie Hsia
(74) *Attorney, Agent, or Firm*—Macheledt Bales & Heidmiller LLP (57) ABSTRACT

A technique, and associated system and computer executable program code on a computer readable storage medium, for automatically correcting distortion of a front-projected display under observation by at least one camera. The technique may be employed in a myriad of front-projected display environments, e.g., single or multiple projectors and cameras are used. The technique includes: observing a first image, projected from at least one projector, comprising at least one target distribution of light intensities; for each conglomeration of white pixels of a difference image, compute a bounding box comprising a corresponding conglomeration of pixels in a framebuffer information of the camera, compute a bounding box comprising a corresponding conglomeration of pixels in a framebuffer information of the projector, compute an initial homography matrix, $H_{temp}$, mapping pixels of the projector's bounding box to those of the camera's bounding box, optimize the initial homography matrix, compute a central location, $(C_x, C_y)$, of the camera's bounding box using the initial homography matrix; and using a plurality of correspondence values comprising the correspondence, compute a corrective transform to aid in the automatic correcting of the display.

14 Claims, 4 Drawing Sheets

OTHER PUBLICATIONS

Rahul Sukthankar, Stockton, R.G., and Mullin, M.D., "Automatic Keystone Correction for Camera-assisted Presentation Interfaces," {labeled "ATTACHMENT E" of applicants' provisional app. filed Dec. 3, 2002 as background technical information}.

R. Raskar and Beardsley, P., "A Self Correcting Projector," *In Proceedings of IEEE Computer Vision and Pattern Recognition (CVPR)*, 2001, Hawaii (Dec. 2001) pp. ??.

Ruigang Yang, Gotz, D., Hensley, J., Towles, H., and Brown M.S., "PixelFlex: A Reconfigurable Multi-Projector Display System," date ??.

Han Chen, R. Sukthankar, G. Wallace, and Tat-Jen Cham, "*Calibrating Scalable Multi-Projector Displays Using Camera Homography Trees*." Included here by way of background, only; noting that a corresponding citation of this group was made to [1] Technical Report TR-639-01, Princeton University, dated Sep. 2001; this document was available on-line for viewing on Dec. 4, 2001 and printed on that date.

R. Samantha, J. Zheng, T. Funkhouser, K. Li and J. Pal Singh, "*Load Balancing for Multi-Projector Rendering Systems*." Included here by way of background, only; noting that this document was available on-line for viewing on Dec. 4, 2001 and printed on that date from: http://citeseer.nj.nec.com/update/201288 (listed on cover page).

R. Samantha, and T. Funkhouser, "*Dynamic Algorithms for Sorting Primitives Among Screen-Space Tiles in a Parallel Rendering System*." Included here by way of background, only; noting that this document was available on-line for viewing on Dec. 4, 2001 and printed on that date from: http://citeseer.nj.nec.com/.

* cited by examiner

MONITORING AND CORRECTION OF GEOMETRIC DISTORTION IN PROJECTED DISPLAYS

The applicants hereof filed pending U.S. patent application Ser. No. 10/315,377 entitled Dynamic Shadow Removal from Front Projection Displays on Dec. 9, 2002; subject matter of application Ser. No. 10/315,377 and that of the instant application, as well as the pending provisional application to which this application claims benefit, was all commonly-owned by the assignee hereof at the time of invention.

This application claims the benefit of pending U.S. provisional patent application No. 60/430,575 filed Dec. 3, 2002 for the applicants on behalf of the assignee hereof. The invention disclosed herein was made with United States government support awarded by the following agency: National Science Foundation, under contract number NSF-4-62699. Accordingly, the U.S. Government has certain rights in this invention.

BACKGROUND OF THE INVENTION

In general, the present invention relates to light projector systems used for information display on a surface. Most, if not all, light projector systems are subject to display distortion, whether caused by perturbations of an electronic and/or mechanical nature (e.g., vibrations common to most viewing environments, such as ventilation system operation, doors closing, and so on), resulting in display mis-calibration. Here, the continuous monitoring of an active display is done to acquire a model of the display surface while the display is in use. Light-projectors are being explored and used for more-demanding tasks in connection with augmented-reality applications, interactive displays, and groups of projectors employed to collectively render high-resolution immersive environments. The placement of projectors is often constrained by the amount of display distortion that can be tolerated. In order to avoid image distortion, a projector must either be placed so that the optic axis is perpendicular to the display surface plane or the display distortion must be corrected. Tilting a projector in the vertical plane induces a distortion commonly referred to as keystoning. Arbitrary placement of a projector yields an image that is governed by a more general projective distortion. Off-axis placement of light projectors induces significant planar parallax on the display surface. Although commodity solutions exist for removing this distortion, they involve iterative, menu-driven user interaction or physical alignment of the projector, and in either case interrupt the use of the display. User interaction is infeasible in a number of scenarios including mechanically aligned multi-projector displays that are subject to mechanical drift and perturbations; in those cases, projector(s) must be manually reconfigured, often.

More-particularly, the instant invention is directed to a technique and system for continuous rectification of arbitrary off-axis distortions that does not require user monitoring/interaction by incorporating at least one camera into the display system to function in a novel process to continuously monitor the state of calibration. Of interest, here, is to correct distortions due to the relative positioning of the projector with respect to the display surface. The (one or more) camera(s) automatically detects when the projector's orientation has changed, without requiring explicit fiducial or targets in the world coordinate system. The method runs in concert with interactive display applications and has minimal impact on frame-rate. An initial rectifying transform is recovered automatically by projecting target 'points', or fiducials/targets of a selected intensity/brightness distribution, and observing them within a camera. The display is then warped and passively monitored for calibration error and motion of the projector. The technique distinguishes between distortions due to miscalibration and intentional/desired projector framebuffer changes. A consistency/correlation/similarity score is calculated (and optimized) by, first, generating a predicted view based on the current framebuffer contents and correlating this prediction with the camera's captured, or observed, image. This may be accomplished by normalizing a correlation function, whereby an overall consistency measure is derived through randomly sampling points within a small mask of selected size of the predicted view and correlating them with corresponding points over a neighborhood in the observed/captured image. Poor correlation scores indicate that the projector has moved and re-calibration and geometric correction is required. Calibration consistency measures are sufficiently robust to distinguish small motion of the projector from continuously changing imagery.

As one will readily appreciate in connection with the instant technical disclosure, there are many fundamental distinguishing features of the instant invention from conventional methods. On occasion, the following manuscript authored by the applicants included herewith and labeled ATTACHMENT A (Steele and Jaynes, 2002) is referenced herein: Robert M. {Matt} Steele, and Jaynes, Christopher O., "Monitoring and Correction of Geometric Distortion in Projected Displays," pgs. 1–8, Central European Conference on Computer Graphics and Computer Vision, 4–8 Feb. 2002; Steele and Jaynes, 2002 is incorporated by reference herein to the extent it provides technical background information, by illustrating the rigorous mathematical and engineering analyses performed by applicants of their unique technique and system.

SUMMARY OF THE INVENTION

It is a primary object of this invention to provide a technique, and associated system and computer executable program code on a computer readable storage medium, for automatically correcting distortion of a front-projected display under observation by. at least one camera. The technique of the invention may be employed in a myriad of front-projected display environments, whether single or multiple projectors and cameras are used, and associated features of the system and program code will be accordingly adapted. Shown here by way of example for simplicity, is a projector-camera pair employed according to the invention. As shown and supported, the method includes: observing a first image, projected from at least one projector, comprising at least one target distribution of light intensities; for each conglomeration of white pixels of a difference image, compute a bounding box comprising a corresponding conglomeration of pixels in a framebuffer information of the camera, compute a bounding box comprising a corresponding conglomeration of pixels in a framebuffer information of the projector, compute an initial homography matrix, $H_{temp}$, mapping pixels of the projector's bounding box to those of the camera's bounding box, optimize the initial homography matrix, compute a central location, $(C_x, C_y)$, of the camera's bounding box using the initial homography matrix; and using a plurality of correspondence values comprising the correspondence, compute a corrective transform to aid in the automatic correcting of the display.

As one will appreciate, there are numerous further patentably distinguishing features of the technique, system and program code of the invention including monitoring of the front-projected display by periodically observing a current image, and so on.

As can and will be appreciated, certain of the many unique features, as well as the further-unique combinations thereof, supported and contemplated hereby within the spirit and scope of this disclosure, may provide a variety of advantages. The advantages of the new features and combinations disclosed hereby will be appreciated, by perusing the instant technical discussion, including drawings, claims, and abstract, in light of drawbacks to traditional devices identified throughout, or as may be uncovered. The unique technique provides design options and versatility to accommodate a wide variety of applications:

(a) Ease of operability—The invention provides an ability to automatically correct distortion/keystoning experienced by front-projected displays and make associated adjustments without operator intervention, allowing the party presenting the display full opportunity to focus on the presentation material, or in the case of fully-automated presentation/entertainment, fewer (if any) display distractions will need maintenance operator intervention.

(b) Flexibility of design and use—The technique of the invention can be tailored for use to detect and address a wide variety of distortion/keystoning experienced by front-projected displays that may affect a display in a wide variety of display environments.

(c) Manufacturability—The unique technique and system of the invention can be tailored to current, as well as those under development or yet-to-be-developed, single and multi-projector-camera projection systems providing a cost-effective means by which systems can be upgraded, or sold initially as a complete package.

BRIEF DESCRIPTION OF THE DRAWINGS

For purposes of illustrating the innovative nature plus the flexibility of design and versatility of the preferred system and technique disclosed hereby, the invention will be better appreciated by reviewing the accompanying drawings (in which like numerals, if included, designate like parts). One can appreciate the many features that distinguish the instant invention from known attempted techniques. The drawings have been included to communicate the features of the innovative platform structure and associated technique of the invention by way of example, only, and are in no way intended to unduly limit the disclosure hereof.

DETAILED DESCRIPTION OF EMBODIMENTS DEPICTED IN DRAWINGS

In connection with discussing the features in FIGS. 1–2, occasional reference will be made back-and-forth to other of the figures, especially, FIGS. 3–4 which detail core, as well as further unique and distinguishing features of technique of the invention 50—and further providing a pictorial demonstration of the flexibility of design of applicant's invention. As one can appreciate, the configuration of the simplified projector-camera pair system 10 in FIG. 1 is suitable for a wide variety of display environments.

Figure 1:
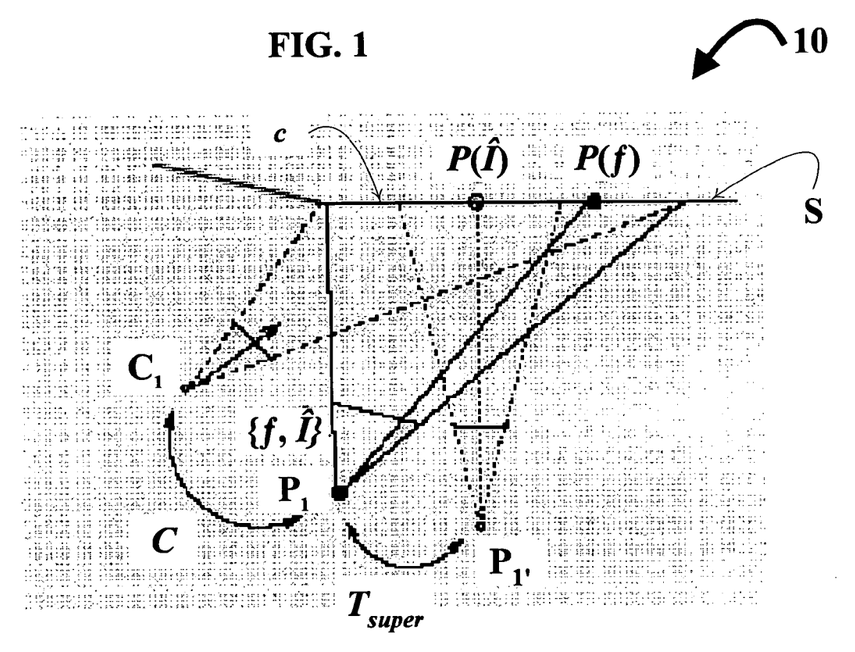
FIG. 1 depicts a projector-camera system 10, having for example, at least one projector at position $P_1$. $P_{1'}$ designates a simulated position for projector $P_1$ once the projector's framebuffer is warped, so that the projector's optic axis is ~parallel to the display surface normal, according to the invention. While only one projector is projecting to contribute to the display of surface S, additional projectors may be included; at least one camera $C_1$ is also depicted.

FIG. 1 depicts a projector-camera system 10, having for example, at least one projector at position $P_1$. $P_{1'}$ designates a simulated position for projector $P_1$ once the projector's framebuffer is warped, so that the projector's optic axis is ~parallel to the display surface normal, according to the invention. While only one projector is projecting to contribute to the display of surface S, additional projectors may be included; at least one camera $C_1$ is also depicted. As further explained, at least one camera is used in concert with the light projector to detect changes in the display due to calibration error that arises, for example, from projector motion, changes in display surface orientation, or both (mechanical perturbation).

Figure 2:
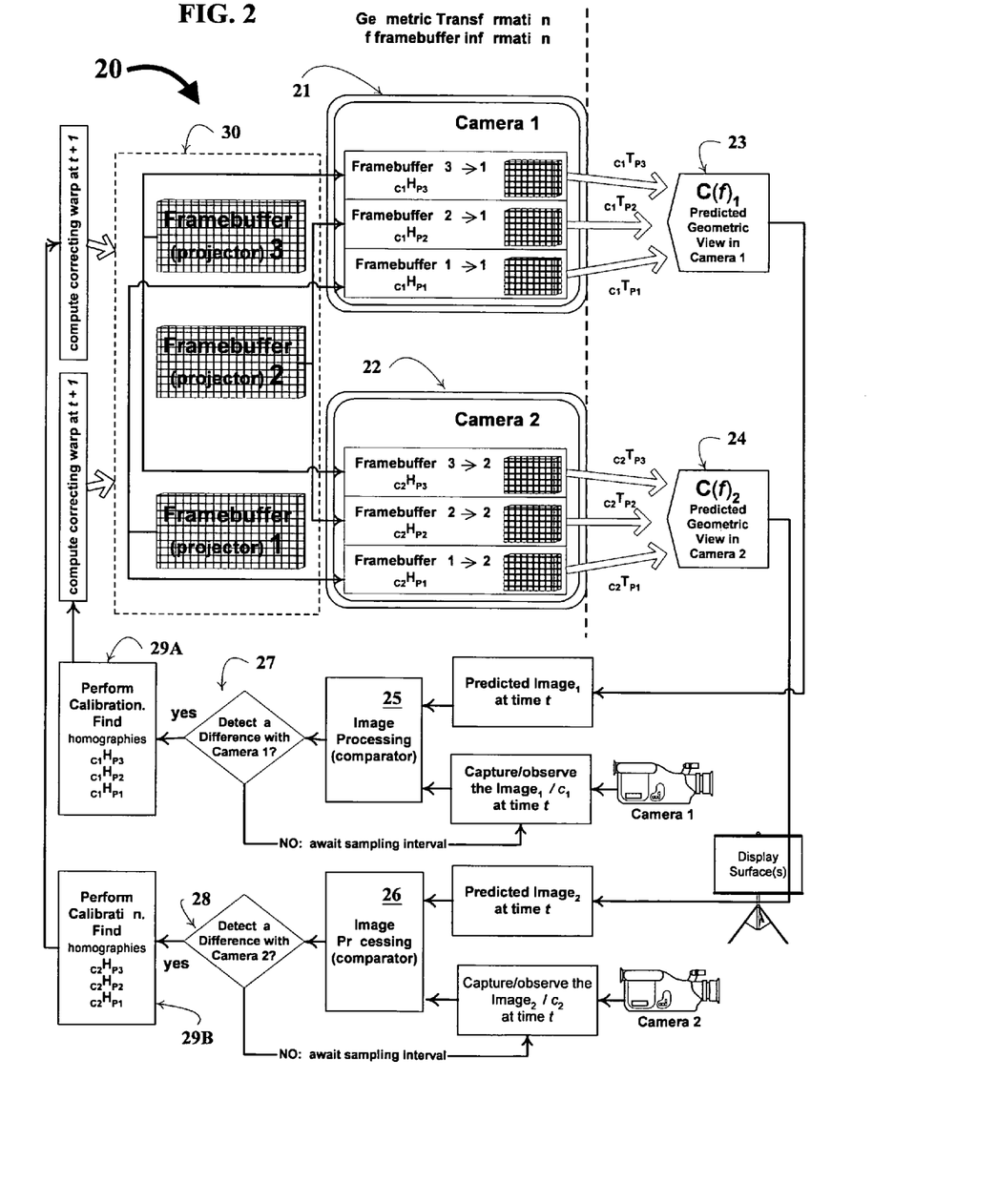
FIG. 2 is a system schematic depicting data/information flow in connection with a multi-projector system that includes the projector-camera pair of FIG. 1 (framebuffers are identified 1, 2, and 3 and associated with a respective projector and each camera 1 and 2).

FIG. 2 is a system schematic depicting data/information flow in connection with a multi-projector system that includes the projector-camera pair of FIG. 1 (framebuffers are identified 1, 2, and 3 and associated with a respective projector and each camera 1 and 2). Preferably, at least one camera is able to observe the screen surface at all times for which the process of detecting is engaged. For example, the placement of the cameras in the display environment might be: mounting overhead to minimize the chance of occlusion by the user.

Calibration of each device within the system engaged in producing the display is critical to detection and a resulting corrective adjustment. Initially, changes due to unexpected radiometric artifacts on the display surface are detected. Predicted imagery is constructed for a specific camera position and color transfer function and compared to captured images. Predicted images 23, 24 (FIG. 2) are constructed using the identified position of the camera with respect to each projector as well as a unique color (transfer function) calibration phase applied in a straightforward manner. The features of system 20 depicted in FIG. 2 are herein referenced in connection with a multi-projector system of the invention, such as that in FIG. 1. Given a camera (21 and 22) and projector pair, geometric calibration comprises the transformation from pixels in the camera plane (shown within box defined at 21 and box defined at 22) to their corresponding positions in the projectors' frame buffers (depicted within dashed box 30 are three framebuffers identified as 1–3). Once the homography between each projector and the camera has been recovered, a composition homography can be constructed to relate projector pixels to one another. Each projector projects a grid pattern that is parallel the axes of its own framebuffer. Given the known calibration, a coherent grid can be drawn by all projectors in the respective reference frame of a single projector. Thus, any image (coherent) can be rendered.

While a planar assumption is not a requirement, however, it is used by way of example in the analysis done, here.

Presume that the camera devices observe a plane. Preferably, the subpixel location of each matchpoint center in the camera frame may be estimated by fitting a 2D Gaussian function governed by two parameters {mean and variance}, with the distortion parameters being eight independent values of distorting homography. Initially, a bounding box is fit/constructed around a detectable 'blob' of pixels in the projector framebuffer whose center and size provides the initial estimate of the unknown homography matrix. For this bounding box, let's say that its top is at $p_y$+sigma, it's bottom is at $p_y$–sigma, its left edge is at $p_x$–sigma, and it's right edge is at $p_x$+sigma. Note that the projector bounding box has four corners, as does a bounding box calculated for the blob mapped to the camera. One can then list four correspondences, matchpoints, consisting of: [(upper-left corner of projector's bounding box), (upper-left corner of camera's bounding box)]; [(upper-right corner of projector's bounding box), (upper-right corner of camera's bounding box)]; and so on. These four correspondences can be used to compute a homography matrix, call it H for temporary reference, here. Next, take what the projector projected, and warp it through H to build a predicted view of what the camera should have seen. All ten parameters are then optimized so as to minimize the sum of the squared distances between the observed blob pixels and the distorted Gaussian predicted by unknown parameters. This technique has provided very good subpixel estimates, with simulated data, accurate to within ~0.25 pixels. The resulting subpixel camera coordinates are then stored with its matching projector pixel $p_j$.

Figure 3:
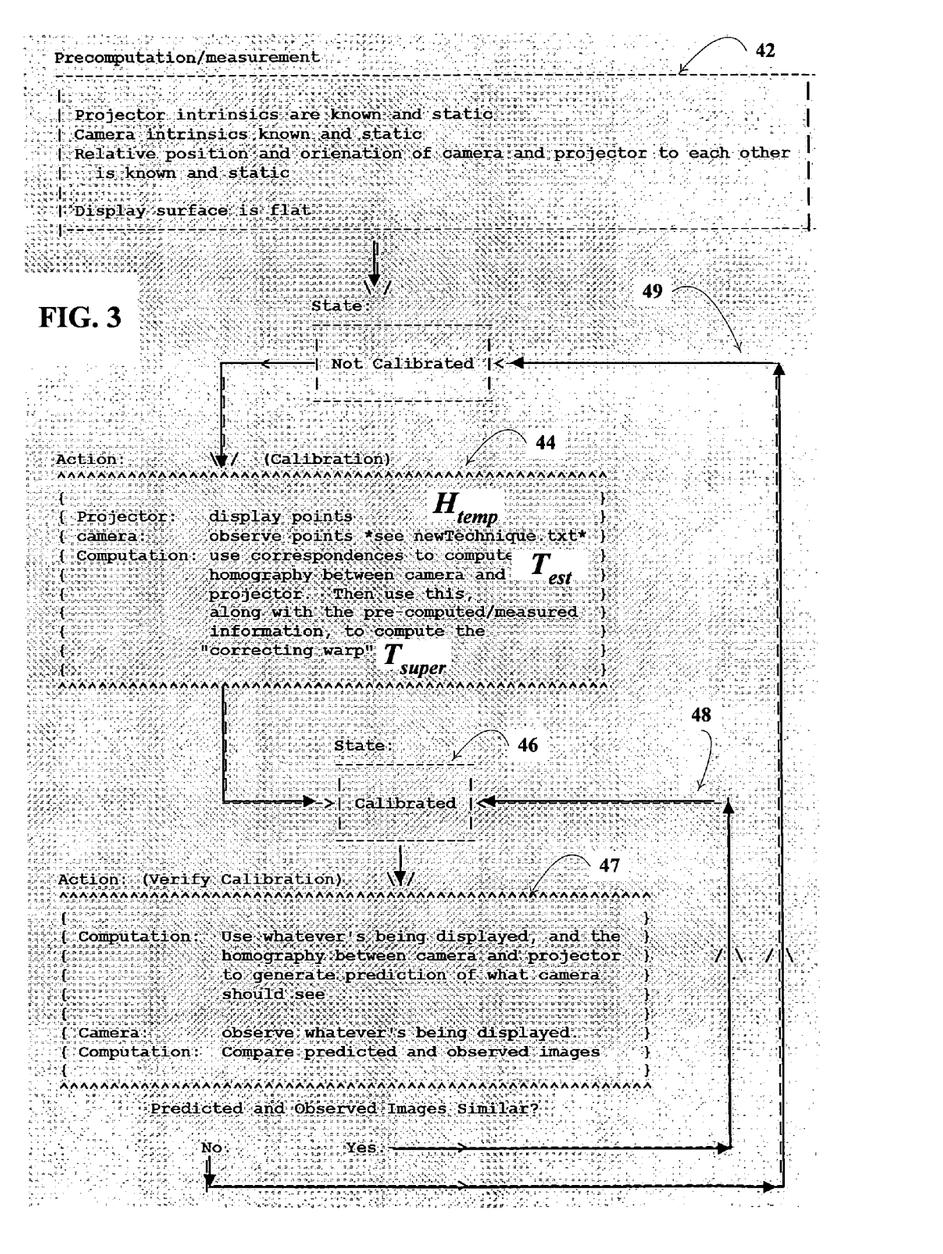
FIG. 3 is a high-level depiction in flow-diagram format, of a technique of the invention.

FIG. 3 is a high-level depiction in flow-diagram format, of a technique of the invention. As can be better appreciated by viewing the lower-loop 48 shown in FIG. 3 comprising a motoring technique (box 47 Verify Calibration): C (in the case of a planar surface represented in FIG. 1, C is the homography, $H_{cp}$) is used to construct a predicted image, C(Î), that can be compared to the corresponding captured image, c. Using information currently in the projector framebuffer (i.e., the framebuffer contents), rather than having to project a calibration target as is required by the few known image-projection calibration techniques, the instant invention is able to detect calibration error in real-time using much less of available computer/cost resources than known techniques. By way of reference only, it is the contents of the framebuffer that gets analyzed: the set of points in 2-D array defining pixels (associated color and intensity values) to be projected by the projector that form the image display. A framebuffer is an area of memory used to hold a frame of data, and is typically used for screen display (sized to accommodate the maximum image area on screen). It can be a separate memory bank on the display adapter that holds the bitmapped image while it is being "painted" on screen.

The depiction of the invention in flow-diagram format in FIG. 3 illustrates three main operations of the automatic calibration technique according to the invention identified as follows: Precomputation/measurement 42 (a pre-calibration that preferably takes place once a camera is fixed in relation to the projector by suitable means, at 'the factory'); Calibration 44 performed with the camera-projector apparatus on-site, turned on and ready for operation in connection with a static and/or video/motion display presentation (and in the case of an on-going presentation—according to the outer loop 49—a "re-calibration" would be performed to correct display that has been perturbed (including lighting changes, shift in projector position, perhaps occlusions in front of the display, and so on); and Verify Calibration 47 where a preferably random sample of the framebuffer is taken to continuously monitor display for a perturbation requiring a re-calibration (this lower loop 48 might be referred to as "display-sense" loop illustrating the component of the invention that provides on-going monitoring until a display presentation is ended).

To begin, a summary of certain features of a basic-core technique for computing matchpoints, follows:
1. Project nothing (i.e. just project a black image).
2. Observe this image with the camera, and call it the background image B.
3. Project a point at some location ($p_x$, $p_y$) in the projector's image coordinates (also called framebuffer).
4. Observe this image with the camera, and call it the foreground image F.
5. Compute a difference image, D=F–B.
6. Inspect each pixel of the difference image, D: If the pixel under consideration is brighter than a threshold pixel intensity, t, set the pixel to white. Otherwise, set it black. Resulting image is considered a binary image, because there are only two colors of pixels in it, white and black.
7. To find the biggest conglomeration (blob) of white pixels in this image, use a known technique called connected component analysis.
8. Draw/compute a rectangle (or "bounding box") around the biggest identified conglomeration (blob) of white pixels (step 7) such that, the sides of the box are parallel with the sides of the image. The center of this rectangle, ($C_x$, $C_y$) is used as an estimate of where the camera saw the "point" projected during step 3.
9. Output [($p_x$, $p_y$), ($C_x$, $C_y$)]. This is the correspondence, or "matchpoint". [Preferably, must perform this routine at least four times to estimate the homography, i.e., the projector to camera transform.]

In connection with step 3. outlined above, note that a "point" target is projected at some preselected location of the projector's framebuffer. Preferably according to the invention, the target/fiducial takes the form of a projected white, filled-in circle, or Guassian distribution of light intensities, comprising a white center that fades into darker shades of gray the further one moves from the white center, until the surrounding region is solid black (resulting in a blurred, filled-in circle)—the intensity (brightness, or whiteness) of this fiducial being governed by the following expression:

$$I(x, y) = e^{-((x-p_x)^2 + (y-p_y)^2)/\text{sigma}}$$

This expression defines circularly symmetric two-dimensional Gaussians—or, blurred circles—of a preselected size, where "sigma", the variance, is a value set such that the blurred circular targets are of the selected size (by way of example only, sigma can be set between ~5 and 15 pixels).

Referring to step 8., an alternative to that outlined above, includes the following: While a rectangle (bounding box) can be computed around the identified conglomeration (blob) of white pixels, the center of which, ($C_x$, $C_y$) is used as an estimate of where the camera saw the "point" projected, such a bounding box can also be constructed for the largest conglomeration (blob) of white pixels in the projector framebuffer. For this bounding box, let's say that its top is at $p_y$+sigma, it's bottom is at $p_y$–sigma, its left edge is at $p_x$–sigma, and it's right edge is at $p_x$+sigma. Note that the projector bounding box has four corners, as does the bounding box drawn/calculated for the blob in the camera. One can then list four correspondences, consisting of: [(upper-left corner of projector's bounding box), (upper-left corner of camera's bounding box)]; [(upper-right corner of projector's bounding box), (upper-right corner of camera's bounding box)]; and so on. These four correspondences can be used to compute a homography matrix, call it $H_{temp}$ [NOTE: The goal is to compute a homography, while $H_{temp}$ is a rough estimate of it, as used here, $H_{temp}$ is simply an intermediate step to help compute a matchpoint, later on]. Next, for example, one can evaluate a normalized cross correlation—an image "similarity/correlation score" that is well-known in image processing and computer vision—on those pixels that fall inside the bounding box computed for the camera. This similarity score, as a function of $H_{temp}$ is maximized: $H_{temp}$ has 8 parameters (here, one can take advantage of the radial symmetry of the Gaussian pattern selected to reduce $H_{temp}$ to 7 parameters, to speed up computation); using an iterative multidimensional optimization technique such as MIN-PACK's lmdif( ) searcher or Numerical Recipes in C API ("application programming interface")—both of which are currently distributed, find the $H_{temp}$ that maximizes the similarity score. From this $H_{temp}$ (using the H output by the search technique), take $(C_x, C_y) = H_{temp}(p_x, p_y)$. One can then output the $[(p_x, p_y), (C_x, C_y)]$, which is the correspondence sought (step 9 above). Applicants have found that, using simulated data with simulated noise, errors produced are consistently below 0.1 pixel, which compares very favorably to the errors using known techniques.

Figure 4:
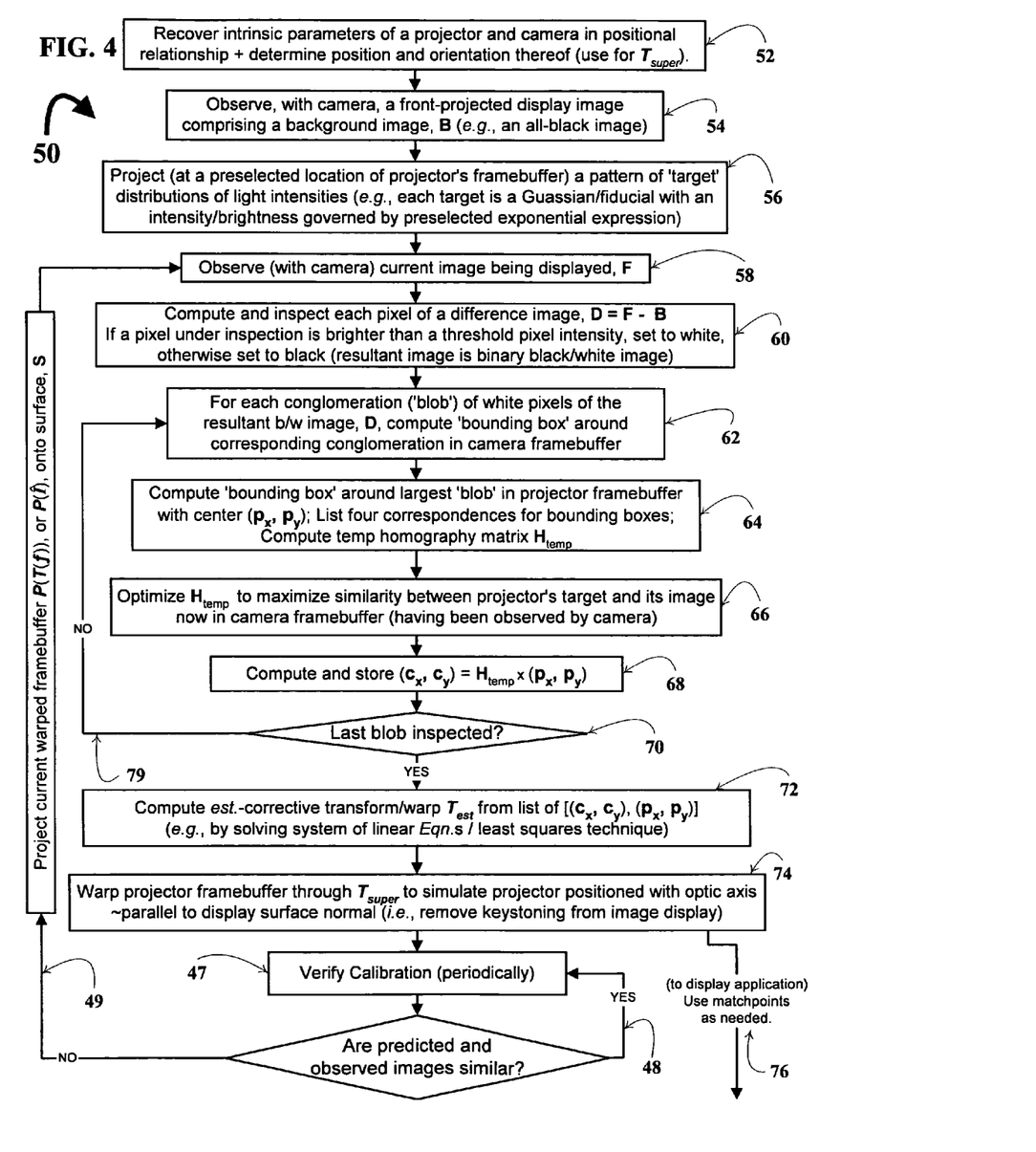
FIG. 4 is a flow diagram depicting details of a method, or technique, 50 for automatically correcting distortion of a front-projected display under observation by at least one camera—illustrated are core, as well as further distinguishing, features of the invention for producing displays using features such as those represented/illustrated by FIGS. 1–3.

FIG. 4 is a flow diagram depicting details of a method, or technique, 50 for automatically correcting distortion of a front-projected display under observation by at least one camera-illustrated are core, as well as further distinguishing, features of the invention for producing displays using features such as those represented/illustrated by FIGS. 1–3. The technique (see FIG. 3 and FIG. 4 at 50) for automatically correcting distortion of a front-projected display under observation by a camera, the method comprising the steps of: observing a first image, projected from at least one projector, comprising at least one target distribution of light intensities; for each conglomeration of white pixels of a difference image, compute a bounding box comprising a corresponding conglomeration of pixels in a framebuffer information of the camera, compute a bounding box comprising a corresponding conglomeration of pixels in a framebuffer information of the projector, compute an initial homography matrix, $H_{temp}$, mapping pixels of the projector's bounding box to those of the camera's bounding box, optimize the initial homography matrix, compute a central location, $(C_x, C_y)$, of the camera's bounding box using the initial homography matrix; and using a plurality of correspondence values comprising the correspondence, compute a corrective transform to aid in the automatic correcting of the display. Furthermore, using the corrective transform and a set of intrinsic parameters of the camera and the projector, one can compute a corrective warp; using the corrective warp, compute an updated projector framebuffer information. One can also calculate matchpoints for use by an application program code.

One may further: observe an updated image resulting from projecting the updated projector framebuffer information; using a second homography, C, construct a predicted image of the updated image; and in the event the updated predicted image is not substantially similar to the updated image, compute a new corrective transform. To computing a new corrective transform, one can: (1) observing a current image; (2) for each conglomeration of white pixels of a current difference image, compute a current bounding box comprising a corresponding conglomeration of pixels in a current framebuffer information of the camera, compute a current bounding box comprising a corresponding conglomeration of pixels in a current framebuffer information of the projector, compute a current homography matrix mapping pixels of the projector's current bounding box to those of the camera's current bounding box, optimize the current homography matrix, compute a current central location, $(C_x, C_y)$, of the camera's current bounding box using the current homography matrix; and (3) using a plurality of current correspondence values comprising the current correspondence, compute the new corrective transform. Using the new corrective transform and the set of intrinsic parameters of the camera and the projector, one can compute a current corrective warp; and using the current corrective warp, one ca compute a current updated projector framebuffer information.

The step to optimize the initial homography matrix may include evaluating a normalized similarity score on pixels within the camera's bounding box; and the step of computing a corrective transform may include applying a least squares fit technique. The monitoring the front-projected display can include: periodically observing a current image; and computing a current corrective transform.

A system for automatically correcting distortion of a front-projected display region under observation by a camera, according to the invention can have the following features: the display comprising a projected image from at least one projector, the projected image comprising a first image having at least one target distribution of light intensities, and thereafter, an updated image resulting from projecting a correctively-warped projector framebuffer information; and at least one processor adapted for, for each conglomeration of white pixels of a difference image, (a) computing a bounding box comprising a corresponding conglomeration of pixels in a framebuffer information of the camera, (b) computing a bounding box comprising a corresponding conglomeration of pixels in a framebuffer information of the projector, (c) computing an initial homography matrix, $H_{temp}$, mapping pixels of the projector's bounding box to those of the camera's bounding box, (d) optimizing the initial homography matrix, (e) computing a central location, $(C_x, C_y)$, of the camera's bounding box using the initial homography matrix, and (e) using a plurality of correspondence values comprising the correspondence, computing a corrective transform and, therefrom, computing a corrective warp for the automatic correcting of the display.

A computer executable program code on a computer readable storage medium for automatically correcting distortion of a front-projected display under observation by a camera, may include the following features: a first program sub-code for observing a first image, projected from at least one projector, comprising at least one target distribution of light intensities; a second program sub-code for: for each conglomeration of white pixels of a difference image, computing a bounding box comprising a corresponding conglomeration of pixels in a framebuffer information of the camera, computing a bounding box comprising a corresponding conglomeration of pixels in a framebuffer information of the projector, computing an initial homography matrix, $H_{temp}$, mapping pixels of the projector's bounding box to those of the camera's bounding box, optimizing the initial homography matrix, computing a central location, $(C_x, C_y)$, of the camera's bounding box using the initial homography matrix; and a third program sub-code for, using a plurality of correspondence values comprising the correspondence, computing a corrective transform to aid in the automatic correcting of the display. Additionally, a fourth program sub-code can be added for: using the corrective transform and a set of intrinsic parameters of the camera and the projector, computing a corrective warp; and, using the corrective warp, computing an updated projector framebuffer information. And a fifth program sub-code may be added for: observing an updated image resulting from projecting the updated projector framebuffer information; using a second homography, C, constructing a predicted image of the updated image; and in the event the updated predicted image is not substantially similar to the updated image, computing a new corrective transform.

The technique of the invention requires little to, preferably, no user interaction to detect and correct geometric distortion and performs continuous monitoring of the corrected image without interrupting the display. In the event that a projector is moved, the system automatically recalibrates and removes the resulting display distortion. A camera monitors the display by accurately predicting the appearance of the framebuffer from the camera's known position and comparing it to captured images Prior to display use, the intrinsic parameters of the projector and camera are recovered (FIG. 4 52). In addition, the relative rotation between the projector and camera is recovered and fixed throughout the process. This assumption is reasonable because the camera can be rigidly attached to the projector that it is monitoring. Once initial calibration is complete, the system computes a projector to camera transform (a homography for the display geometry discussed here) that is then monitored and updated as necessary. This homography is computed by projecting (box 56) known projector a pattern of 'points', or fiducials of a selected shape governed by a known function, and observing their corresponding camera pixels. Additionally a color transfer function is preferably computed which provides a mapping from framebuffer pixel color values to image sensor color values. Both the homography and the color transfer functions govern the predicted appearance of the projector framebuffer as seen from the camera. Predicted images can then be constructed while the display is in use for monitoring and correction of the display. A consistency measure is applied to captured and predicted camera images to determine when calibration is no longer correct.

Given the fixed rotation (52) between the projector and camera as well as the homography between the two, $H_{cp}$, a correcting transform for the display can be computed (as further discussed, below). Subsequent display of the framebuffer is pre-warped according to this transform. As mentioned, FIG. 1 schematically depicts a projector-camera system 10, having for example, projector $P_1$ (while only one is shown, additional projectors may be employed, $P_2$, $P_3$, . . . etc., to contribute to the display region of surface S) and camera $C_1$ (similarly, while only one is shown, additional cameras may be employed) according to the invention. Although the general monitoring and correction approach is applicable to arbitrary surfaces, for simplicity of discussion and computation herein, a planar surface is presumed. Once calibrated and initially rectified, the system can operate in a 'closed-loop' mode to passively monitor, on an ongoing basis—for example, by performing a comparison at randomly spaced, or regular, intervals (FIG. 2 at 25–28)—the projected images with minimal impact on frame-rate. Projector movement is automatically detected by and large real-time, using a consistency measure, permitting the system to automatically recalibrate selected parameters required to derive a new correcting transform.

Turning again to FIG. 1, the projection function defined by the intrinsic and extrinsic parameters of a projection device, along with the display surface geometry, define a function P that maps the framebuffer f into points on the display surface, P(f) (the image of f under P). This function is effectively a warp that is related to the position of the projector with respect to the display surface, the display surface shape, and intrinsic properties of the projector. This mapping creates keystoning or projective distortions that must be removed in order to produce an image in the world that correctly reflects the contents of the framebuffer. Distortions induced by P can be removed through a transform T that 'pre-warps' in a corrective manner, the framebuffer f into $\hat{I}$ prior to projection. Subsequently projected images, P($\hat{I}$), then, are geometrically correct. $T_{est}$ is determined by observing projected points on the display surface from the camera $C_1$ and deriving a set of correspondences (box 72, FIG. 3).

Once $T_{super}$ has been computed and the projector framebuffer has been transformed accordingly, it may be desirable to verify that the projected and warped image, P(T(f)), or P($\hat{I}$), continues to satisfy the original geometric constraints. For example, a user may manually move a projector or calibration may degrade over time due to mechanical drift. If verification is performed, preferably it does not require modification to the framebuffer as the display may be in continuous use. With the projected display actively changing, it is insufficient to simply compute a difference between successive camera images. Therefore, pixels in the framebuffer are correlated to those in the camera through a mapping, C. The relationship C allows the system to predict what it ought to be observing by relating pixels in the current framebuffer, at time t, to their expected locations in a captured image, c. FIG. 1 depicts this situation for the case in which the display surface is planar. Given an initial T and C, a display iteration involves building the contents of a framebuffer, f, (traditional rendering), applying the correcting warp, T(f), to compute a new framebuffer $\hat{I}$, projecting the resulting buffer, P($\hat{I}$), capturing an image of the display, c, and ultimately comparing c to C($\hat{I}$).

A calibration consistency measure, S=C($\hat{I}$)×c, compares captured images to predicted images based on the current calibration estimate. If S falls below a threshold (for example, 0.9), we assume that the current estimate of T is wrong and the image is no longer being correctly 'unwarped'. T is then recomputed by the system automatically and all corresponding warps (P and C) are updated and the system begins re-monitoring the newly corrected display. In addition to the geometric warp C, a transfer function that models the color and intensity change between the devices is estimated. This transfer function, of the form represented in Eqn. 0—and as expressed in Eqn. 10—is applied to points in C(f) to more accurately predict the expected view of the framebuffer from the camera's location.

For example, the transfer function, $f_c(x)$, Eqn. 0, computes the expected value of channel c in the camera image for a projected value of x. The following expression labeled Eqn. 0 is of the form set forth hereafter and numbered Eqn. 10 for modeling color transfer curves.

$$f_c(x) = \frac{a}{1+e^{-a(x-b)}} + k \qquad (0)$$

Typically in data projector systems for human viewing, three color channels, {R, G, B}, corresponding to Red, Green, and Blue color components, respectively, are used. Thus, if the projector projects a pixel with a red-channel value of x, the camera sees that pixel as having a red-channel value of $f_r(X)$. Preferably, a separate color transfer function is computed for each channel independently, thus in addition to the red-channel value of $f_r(x)$ for the green and blue channels, respectively, a value for $f_g(x)$ and $f_b(x)$, is also computed. The parameters a, $\alpha$, b and k used in the various channels {r, g, b} for Eqn. 0 are independent and may be different for each function. These four parameters are preferably discovered/estimated by way of a calibration phase where values of particular known intensities are projected by the projector and observed by the camera.

While the technique of the invention is applicable for arbitrary display surface shape(s), the example detailed further below, once again for simplicity, focuses on a planar display surface. For this configuration, C, P and any T required, is each a homography. With these constraints, T can be computed from the intrinsics and relative orientation/angle of the camera and the projector, along with an extra constraint involving the vector that defines an 'upward' orientation for the image on the wall. T can be written as the homography from the 'world' to the framebuffer, $H_{pw}$. Likewise, C, the mapping from framebuffer to the camera's image plane can be written as $H_{cp}$. Let $X_{ij}$ be a transform, that maps points in the j frame to points i. Then the following govern the transformations from world to the projector frame and projector to camera frame.

$$x_p = R_{pw} x_w + t_{pw} \quad (1)$$

$$x_c = R_{cp} x_p + t_{cp} \quad (2)$$

Because the camera is fixed to the projector, $R_{pc}$ is manually determined in advance through suitable traditional calibration technique(s). Presuming that homographies operate on points in normalized image coordinates, these mappings are determined up to a scale factor by the three-dimensional configuration of the display, as follows:

$$H_{pw} \propto R_{pw} + \frac{t_{pw} n_w^T}{d} \quad (3)$$

$$H_{cp} \propto R_{cp} + \frac{t_{cp} n_p^T}{d} \quad (4)$$

Where $n_w$ and $n_p$ denote the surface normal of the display surface in the world and projector coordinate frames, respectively. The surface normal of the display surface in the projector's coordinate system can be recovered from Eqn. 3. Where d=1 and the display plane is at z=0 in the world coordinate system, then:

$$H_{pw} \propto R_{pw} + \begin{bmatrix} 0 & 0 & t_{pw_x} \\ 0 & 0 & t_{pw_y} \\ 0 & 0 & t_{wp_z} \end{bmatrix} \quad (5)$$

The display plane's surface normal in projector coordinates, $n_p$, defines a rotation which aligns the projector's z-axis with the surface normal of the display plane. This rotation defines a family of homographies that correctly 'pre-warps' the framebuffer. The final pre-warp, T, can then be selected from among these homographies. Eqn. 4 determines $n_p$. $H_{cp}$ is estimated from four matchpoints between f and c. Since the rotation between the camera and projector, $R_{pc}$, is known (calibrated and fixed during an initial phase), a constant of proportionality for Eqn. 4 can be computed:

$$\lambda H_{cp} - R_{cp} = \frac{t_{cp} n_p^T}{d} \quad (6)$$

Since the right hand side of Eqn. 6 is an outer product of two vectors, it has a rank of 1, and yields the following family of equations for $\lambda$, corresponding to the non-zero rows and columns of the right hand side:

$$\frac{\lambda H_{cp_{ij}} - R_{cp_{ij}}}{\lambda H_{cp_{il}} - R_{cp_{il}}} = \frac{\lambda H_{cp_{kj}} - R_{cp_{kj}}}{\lambda H_{cp_{kl}} - R_{cp_{kl}}} \quad (7)$$

For these equations to be valid, at least one must involve components of $n_p$ and $t_{cp}$ that are non-zero. Having computed $\lambda$, a surface normal in the projector frame, $n^p = [n_{p_x} n_{p_y} n_{p_z}]^T$ can then be derived as shown below:

$$\frac{n_{p_x}}{n_{p_y}} = \frac{\lambda H_{cp_{i1}} - R_{cp_{i1}}}{\lambda H_{cp_{i2}} - R_{cp_{i2}}} \quad (8)$$

$$\frac{n_{p_x}}{n_{p_z}} = \frac{\lambda H_{cp_{i1}} - R_{cp_{i1}}}{\lambda H_{cp_{i3}} - R_{cp_{i3}}} \quad (9)$$

$n_p$ is now used to construct a rotation matrix $R_{pw}$, that aligns the projectors optic axis with the surface normal of the display. It is important to note that $n_p$ is a normalized unit vector with only two free parameters. A third parameter used describes the orientation of the projected image on the display surface. In many cases, a user can simply provide this parameter by defining horizontal in the world coordinate system. However, for system flexibility, this free parameter is preferably fixed to a horizontal line in the framebuffer.

Column 1 of $R_{pw}$ is defined to be the component of the projector's x-axis that is perpendicular to $n_p$. Thus, the warped and projected image $P(\hat{I})$, will align with the component of the projector's x-axis that is parallel to the display plane. Finally, T is constructed from $R_{pw}$ and a translation and scale. Translation and scale are chosen so that pixels are mapped into valid framebuffer coordinates while simultaneously maximizing the number of projector pixels used. The corners of the framebuffer are warped using the inverse of T to produce a quadrilateral that is a representation of the frustum of the projector intersected with the display plane (T inverse simulates this process). The biggest box bounded by this quadrilateral that is square with the x- and y-axes of the framebuffer and preserves f's aspect ratio, is computed. The vertices of this box are then associated to the corners of the framebuffer f to construct a new homography. One goal of this approach is to recreate the largest rectified image that can be fit into the quadrilateral induced by the display distortion.

Given a correctly 'pre-warped' and projected image, as mentioned above, continuous monitoring is performed to detect changes in the display due to calibration error that arises from projector motion, changes in display surface orientation, or both. The display monitoring runs in conjunction with the display technique. An image of the camera's view of the display is captured/observed; corresponding pre-warped framebuffer contents, $\hat{I}$, is stored. C is used (in the case of a planar surface, C is the homography $H_{cp}$)

to construct a predicted image, $C(\hat{I})$, that can be compared to the corresponding captured image c.

C encodes the geometric mapping between observed pixels in the camera and rendered pixels in the framebuffer but does not account for radiometric effects. Although the predicted image should be a function of many factors including material properties of the display surface, currently, only the color/intensity bias between the devices is calibrated by the system. For simplicity, the color of a point in c is modeled as a function only of the color of its corresponding point in $C(\hat{I})$. Furthermore, it is assumed that the three colors channels do not interact, giving three color functions that are mutually independent. Color transfer curves, for each color component are modeled by:

$$\gamma(I(i,j)) = \frac{A}{1+e^{a(I(i,j)+b)}} + k \quad (10)$$

In order to determine the free parameters of Eqn. 10, four shades of gray, including white and black are displayed during the calibration process. By splitting each shade of gray into its component colors, the parameters for each of the three transfer functions {Eqn. 10} can be determined.

The similarity measure that detects when $T_{super}$ is no longer valid is a correlation function that operates on pairs of corresponding values in the predicted and color corrected image, $\gamma(C(\hat{I}))$, and the captured image, c. The three color channels of each pixel are correlated separately and summed to compute an overall correlation score. Although the standard normalized cross correlation is capable of correctly matching images features with sufficient structure, it may yield undesirably high values in featureless image regions.

Here, so that the correlation technique performs well for somewhat arbitrary images and does not require explicit search of $\hat{I}$ for good features to match, the correlation function may be normalized, as follows:

$$ncc' = \frac{2\sum_i x_i y_i}{\sum_i x_i^2 + \sum_i y_i^2} \quad (11)$$

An overall consistency measure is derived through randomly sampling k points in $\gamma(C(\hat{I}))$ and correlating them with their corresponding points in the observed image c. For each pair, a small mask of size N×N from $\gamma(C(\hat{I}))$ is correlated over an M×M neighborhood in c. M is related to the expected geometric error of calibration and, for example, may be fixed at 3 pixels. The maximum correlation in this neighborhood is taken to be a correlation score for that pair. A final consistency measure, then, is the average of the pairwise correlations of the random samplings:

$$S = \sum_k \frac{ncc'(X)}{k} \quad (12)$$

where X is a random variable that returns a pixel in $\gamma(C(\hat{I}))$.

Geometric error is not the only factor that influences the correlation values. Given the same geometric error, images with high contrast and high frequency components tend to have lower correlation scores than images without these features. In addition to the current contents of the framebuffer, ambient lighting contributes to these effects. For example, high levels of background light may reduce the overall contrast of the projected imagery. These factors degrade the robustness of the consistency measure; a search for a maximum correlation score over the M×M neighborhood may alleviate these effects.

By way of example only, a single projector and camera system of the invention, see FIGS. 1 through 3 for reference, have been employed as follows: The initial relative position of the camera with respect to the projector was computed and remained fixed throughout. Once initially calibrated, the projector-camera pair is placed at an arbitrary position with respect to a planar display surface and the monitoring system initiated. A stand-alone application that allows users to load an openGL program is run in the foreground on a personal computer. Every two seconds the framebuffer is sampled and a consistency measure, using fifty randomly selected 3×3 templates, was computed according to Eqn. 12 on the color corrected values. If this exceeds a predefined threshold (e.g., 0.90), the system automatically re-initiates the calibration phase and new warping functions and the color transfer curves are recomputed.

While certain representative embodiments and details have been shown merely for the purpose of illustrating the technique of display calibration of projection displays, and an associated system, those skilled in the art will readily appreciate that various modifications, whether specifically or expressly identified herein, may be made to any of the representative embodiments without departing from the novel teachings or scope of this technical disclosure. Accordingly, all such modifications are contemplated and intended to be included within the scope of the claims. Although the commonly employed preamble phrase "comprising the steps of" may be used herein in a method Claim, applicants do not intend to invoke 35 U.S.C. §112 ¶6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A method for automatically correcting distortion of a front-projected display under observation by a camera, the method comprising the steps of:

observing a first image, projected from at least one projector, comprising at least one target distribution of light intensities;

for each conglomeration of white pixels of a difference image, compute a bounding box comprising a corresponding conglomeration of pixels in a framebuffer information of the camera, compute a bounding box comprising a corresponding conglomeration of pixels in a framebuffer information of said projector, compute an initial homography matrix, $H_{temp}$, mapping pixels of said projector's bounding box to those of the camera's bounding box, optimize said initial homography matrix, compute a central location, $(C_x, C_y)$, of the camera's bounding box using said initial homography matrix; and using a plurality of correspondence values comprising said correspondence, compute a corrective transform to aid in the automatic correcting of the display.

2. The method of claim 1 further comprising the steps of:
using said corrective transform and a set of intrinsic parameters of the camera and said projector, compute a corrective warp;
using said corrective warp, compute an updated projector framebuffer information; and
calculating matchpoints for use by an application program code.

3. The method of claim 2 further comprising the steps of:
observing an updated image resulting from projecting said updated projector framebuffer information;
using a second homography, C, construct a predicted image of said updated image; and
in the event said updated predicted image is not substantially similar to said updated image, compute a new corrective transform.

4. The method of claim 3 wherein said step of computing a new corrective transform comprises:
observing a current image;
for each conglomeration of white pixels of a current difference image, compute a current bounding box comprising a corresponding conglomeration of pixels in a current framebuffer information of the camera, compute a current bounding box comprising a corresponding conglomeration of pixels in a current framebuffer information of said projector, compute a current homography matrix mapping pixels of said projector's current bounding box to those of the camera's current bounding box, optimize said current homography matrix, compute a current central location, $(C_{x'}, C_{y'})$, of the camera's current bounding box using said current homography matrix; and
using a plurality of current correspondence values comprising said current correspondence, compute said new corrective transform.

5. The method of claim 4 further comprising the steps of:
using said new corrective transform and said set of intrinsic parameters of the camera and said projector, compute a current corrective warp; and
using said current corrective warp, compute a current updated projector framebuffer information.

6. The method of claim 1 wherein:
said step to optimize said initial homography matrix comprises evaluating a normalized similarity score on pixels within the camera's bounding box; and
said step of computing a corrective transform comprises applying a least squares fit technique.

7. The method of claim 1 further comprising the step of monitoring the front-projected display comprising:
periodically observing a current image; and
compute a current corrective transform.

8. A system for automatically correcting distortion of a front-projected display region under observation by a camera, the system comprising:
the display comprising a projected image from at least one projector, said projected image comprising a first image having at least one target distribution of light intensities, and thereafter, an updated image resulting from projecting a correctively-warped projector framebuffer information; and
at least one processor adapted for, for each conglomeration of white pixels of a difference image, (a) computing a bounding box comprising a corresponding conglomeration of pixels in a framebuffer information of the camera, (b) computing a bounding box comprising a corresponding conglomeration of pixels in a framebuffer information of said projector, (c) computing an initial homography matrix, $H_{temp}$, mapping pixels of said projector's bounding box to those of the camera's bounding box, (d) optimizing said initial homography matrix, (e) computing a central location, $(C_x, C_y)$, of the camera's bounding box using said initial homography matrix, and (e) using a plurality of correspondence values comprising said correspondence, computing a corrective transform and, therefrom, computing a corrective warp for the automatic correcting of the display.

9. The system of claim 8 wherein said at least one processor is further adapted for monitoring the front-projected display.

10. A computer executable program code on a computer readable storage medium for automatically correcting distortion of a front-projected display under observation by a camera, the program code comprising:
a first program sub-code for observing a first image, projected from at least one projector, comprising at least one target distribution of light intensities;
a second program sub-code for: for each conglomeration of white pixels of a difference image, computing a bounding box comprising a corresponding conglomeration of pixels in a framebuffer information of the camera, computing a bounding box comprising a corresponding conglomeration of pixels in a framebuffer information of said projector, computing an initial homography matrix, $H_{temp}$, mapping pixels of said projector's bounding box to those of the camera's bounding box, optimizing said initial homography matrix, computing a central location, $(C_x, C_y)$, of the camera's bounding box using said initial homography matrix; and
a third program sub-code for, using a plurality of correspondence values comprising said correspondence, computing a corrective transform to aid in the automatic correcting of the display.

11. The program code of claim 10 further comprising a fourth program sub-code for: using said corrective transform and a set of intrinsic parameters of the camera and said projector, computing a corrective warp; and, using said corrective warp, computing an updated projector framebuffer information.

12. The program code of claim 11 further comprising a fifth program sub-code for:
observing an updated image resulting from projecting said updated projector framebuffer information;
using a second homography, C, constructing a predicted image of said updated image; and
in the event said updated predicted image is not substantially similar to said updated image, computing a new corrective transform.

13. The program code of claim 12 further comprising a sixth program sub-code for computing said new corrective transform, said sixth program sub-code comprising instructions for:
observing a current image;
for each conglomeration of white pixels of a current difference image, compute a current bounding box comprising a corresponding conglomeration of pixels in a current framebuffer information of the camera, compute a current bounding box comprising a corresponding conglomeration of pixels in a current framebuffer information of said projector, compute a current homography matrix mapping pixels of said projector's current bounding box to those of the camera's current bounding box, optimize said current homography matrix, compute a current central location, $(C_{x'}, C_{y'})$, of the camera's current bounding box using said current homography matrix; and using a plurality of current correspondence values comprising said current correspondence, compute said new corrective transform.

14. The program code of claim 10 further comprising a fourth program sub-code for monitoring the front-projected display.

* * * * *